United States Patent
Yang et al.

(10) Patent No.: US 11,652,412 B2
(45) Date of Patent: May 16, 2023

(54) CONTROL SIGNAL MODULATION CIRCUIT, INVERTER, AND CONTROL SYSTEM

(71) Applicant: SUNGROW RENEWABLES DEVELOPMENT CO., LTD., Hefei (CN)

(72) Inventors: Zongjun Yang, Anhui (CN); Xiaoguang Li, Anhui (CN)

(73) Assignee: SUNGROW RENEWABLES DEVELOPMENT CO., LTD., Hefei (CN)

(*) Notice: Subject to any disclaimer, the term of this patent is extended or adjusted under 35 U.S.C. 154(b) by 0 days.

(21) Appl. No.: 17/608,445

(22) PCT Filed: Dec. 25, 2020

(86) PCT No.: PCT/CN2020/139343
§ 371 (c)(1),
(2) Date: Nov. 2, 2021

(87) PCT Pub. No.: WO2021/136085
PCT Pub. Date: Jul. 8, 2021

(65) Prior Publication Data
US 2022/0216786 A1    Jul. 7, 2022

(30) Foreign Application Priority Data
Jan. 2, 2020    (CN) .......................... 202010001498.9

(51) Int. Cl.
*H02M 3/156* (2006.01)
*H02J 3/38* (2006.01)
*H02M 7/44* (2006.01)

(52) U.S. Cl.
CPC .............. *H02M 3/156* (2013.01); *H02J 3/381* (2013.01); *H02J 2300/24* (2020.01); *H02M 7/44* (2013.01)

(58) Field of Classification Search
CPC .......... H02M 3/156; H02M 7/44; H02M 1/32; H02M 1/36; H02M 3/158; H02M 3/07; H02J 3/381; H02J 2300/24
See application file for complete search history.

(56) References Cited

U.S. PATENT DOCUMENTS

| | | |
|---|---|---|
| 2008/0285317 A1 | 11/2008 | Rotzoll |
| 2016/0181920 A1* | 6/2016 | Dai .................. H02M 1/14 |
| | | 323/271 |
| 2021/0036548 A1 | 2/2021 | Shousha et al. |

FOREIGN PATENT DOCUMENTS

| | | |
|---|---|---|
| CN | 107017767 A | 8/2017 |
| CN | 107070190 A | 8/2017 |

(Continued)

OTHER PUBLICATIONS

Chowdary et al, "An 18 nA, 87% Efficient Solar, Vibration and RF Energy-Harvesting Power Management System with a Single Shared Inductor", IEEE Journal of Solid-State Circuits, vol. 51, No. 10, pp. 2501-2513, Oct. 31, 2016.

(Continued)

*Primary Examiner* — Toan T Vu
(74) *Attorney, Agent, or Firm* — Patterson Thuente, P.A.

(57) ABSTRACT

A circuit for modulating a control signal, an inverter and a system for controlling a photovoltaic string. The circuit is based on a DC/DC boost circuit. The DC/DC boost circuit includes a controllable switch circuit, via which a second capacitor charges a first capacitor in the DC/DC boost circuit. A switch state of a first controllable switch in the DC/DC boost circuit is controlled when a voltage of the first capacitor is greater than or equal to a first voltage threshold, so that the first capacitor generates a control signal with a predetermined characteristic waveform.

17 Claims, 7 Drawing Sheets

(56) References Cited

FOREIGN PATENT DOCUMENTS

| CN | 108054998 A | 5/2018 |
|----|-------------|--------|
| CN | 108418455 A | 8/2018 |
| CN | 108988635 A | 12/2018 |
| CN | 109412406 A | 3/2019 |
| CN | 209120129 A | 7/2019 |
| CN | 107070190 | 6/2020 |
| DE | 102018201925 A | 8/2019 |

OTHER PUBLICATIONS

Office Action corresponding to Canadian Patent Application No. 3136856 dated Jun. 15, 2022.
Written Opinion of the International Searching Authority corresponding to PCT/CN2020/139343 dated Mar. 25, 2021.
International Search Report for PCT/CN2020/139343, dated Mar. 25, 2021, 4 pages.
English translation of International Search Report with English translation for PCT/CN2020/139343, dated Mar. 25, 2021, 2 pages.
First Office Action with English translation for CN 202010001498.9 dated Jan. 6, 2022, 11 pages.
Reverter et al., "Optimal Inductor Current in Boost DC/DC Converters Regulating the Input Voltage applied to Low-Power Photovoltaic Modules", 0885-8993 (c) 2016 IEEE. Personal use is permitted, but republication/redistribution requires IEEE permission. See http://www.ieee.org/publications_standards/publications/rights/index.html for more information.
Office Action corresponding to Canadian Patent Application No. 3136856 dated Dec. 19, 2022.

* cited by examiner

CONTROL SIGNAL MODULATION CIRCUIT, INVERTER, AND CONTROL SYSTEM

The present application is a national phase application of PCT international patent application PCT/CN2020/139343, filed on Dec. 25, 2020 which claims priority to Chinese Patent Application No. 202010001498.9, titled "CONTROL SIGNAL MODULATION CIRCUIT, INVERTER, AND CONTROL SYSTEM", filed on Jan. 2, 2020 with the Chinese Patent Office, both of which are incorporated herein by reference in their entireties.

FIELD

The present disclosure relates to the field of control technology, and in particular to a circuit for modulating a control signal, an inverter and a control system.

BACKGROUND

In a control system, a controller is required to perform signal interaction with a controlled object, to control the controlled object. For example, in a photovoltaic system, an inverter controls an operation state of a photovoltaic string, which requires signal interaction between the inverter and the photovoltaic string. However, in the conventional technology, the signal interaction between the controller and the controlled object requires a dedicated communication system, or has high requirements for hardware. Therefore, a solution for modulating a control signal which requires no dedicated communication system and has low hardware cost is urgently required.

SUMMARY

In view of the above, a circuit for modulating a circuit, an inverter and a control system are provided according to the present disclosure, so as to reduce hardware cost without a dedicated communication system. The technical solutions are described as follows.

According to a first aspect of the present disclosure, a circuit for modulating a control signal is provided. The circuit includes a DC/DC boost circuit and a control unit. The DC/DC boost circuit includes a first capacitor, a first inductor, a first controllable switch, a second capacitor, and a controllable switch circuit. The first capacitor is connected in parallel with an input end of the DC/DC boost circuit. The second capacitor is connected in parallel with an output end of the DC/DC boost circuit. A terminal of the first inductor is connected to a positive input port of the DC/DC boost circuit, and another terminal of the first inductor is connected to a positive output port of the DC/DC boost circuit via the controllable switch circuit. A terminal of the first controllable switch is connected to a common terminal of the first inductor and the controllable switch circuit, and another terminal of the first controllable switch is connected to a negative input port. The control unit is configured to control, when a voltage of the first capacitor is greater than or equal to a first voltage threshold, at least one of a duty cycle of a signal for controlling the first controllable switch and a frequency for controlling the first controllable switch, to control the first capacitor to generate a control signal with a predetermined characteristic waveform.

In an embodiment, the controllable switch circuit includes a first unidirectional conduction device and a second controllable switch. An anode of the first unidirectional conduction device is connected to the first inductor, and a cathode of the first unidirectional conduction device is connected to a negative output port of the DC/DC boost circuit. The second controllable switch is connected in parallel with the first unidirectional conduction device. Alternatively, the second controllable switch is connected in parallel with a branch formed by connecting the first inductor in series with the first unidirectional conduction device.

In an embodiment, the controllable switch circuit further includes a current limiting device connected in series with the second controllable switch.

In an embodiment, the controllable circuit includes a third controllable switch connected in series with the first inductor.

In an embodiment, the control unit is further configured to: control the controllable switch circuit to be switched on when the voltage of the first capacitor is greater than or equal to the first voltage threshold, to charge the first capacitor by the second capacitor; or control the controllable switch circuit to be switched on when the first controllable switch is controlled to be switched off, to charge the first capacitor by the second capacitor.

In an embodiment, the control unit is further configured to: control the controllable switch circuit to be switched on when a voltage of the second capacitor is greater than or equal to a second voltage threshold, to control the second capacitor to discharge.

In an embodiment, the circuit further includes a direct current power supply circuit, a fourth controllable switch and a second unidirectional conduction device. An output port of the direct current power supply circuit is connected in series with the fourth controllable switch and the second unidirectional conduction device sequentially, and is connected to the input end of the DC/DC boost circuit. An alternating current end of the direct current power supply circuit is configured to connect with an alternating current power supply. The second unidirectional conduction device is configured to cause electric energy outputted by the direct current power supply circuit to flow to the input end of the DC/DC boost circuit. The control unit is further configured to: control the fourth controllable switch to be switched on when the voltage of the first capacitor is less than or equal to the first voltage threshold, to charge the first capacitor by the direct current power supply circuit; or control the fourth controllable switch to be switched on when the first controllable switch is controlled to be switched off, to charge the first capacitor by the direct current power supply circuit.

According to a second aspect of the present disclosure, an inverter is provided. The inverter includes an inverter circuit, an inverter controller and the circuit for modulating a control signal described in the first aspect. The output end of the DC/DC boost circuit is connected to a direct current end of the inverter circuit, and the input end of the DC/DC boost circuit is configured to connect a photovoltaic string. The inverter controller is configured to: acquire a control signal generation instruction; and transmit the control signal generation instruction to the control unit of the circuit for modulating a control signal, where the control unit controls the first capacitor to generate the control signal with the predetermined characteristic waveform.

In an embodiment, the inverter controller is configured to transmit, in response to an instruction for switching off the photovoltaic string, a switch-off signal generation instruction to the control unit, where the control unit controls a switch state of the first controllable switch in the DC/DC boost circuit in response to the switch-off signal generation instruction, to control the first capacitor to generate a switch-off control signal with a first characteristic waveform. The inverter controller is further configured to transmit, in response to an instruction for switching on the photovoltaic string, a switch-on signal generation instruction to the control unit, where the control unit controls, in response to the switch-on signal generation instruction, the second capacitor of the DC/DC boost circuit or the direct current power supply circuit to charge the first capacitor until the voltage of the first capacitor reaches the first voltage threshold, where a switch state of the first controllable switch is controlled, to control the first capacitor to generate a switch-on control signal with a second characteristic waveform.

In an embodiment, the inverter includes multiple direct current input ends respectively connected to circuits for modulating a control signal as described in the first aspect. For each of the circuits for modulating a control signal, the input end of the DC/DC boost circuit is connected to a direct current input end of the inverter corresponding to the circuit for modulating a control signal. Output ends of all the DC/DC boost circuits are connected in parallel and are connected to a direct current input end of the inverter circuit. All the DC/DC boost circuits share the second controllable switch, or share the fourth controllable switch, the second unidirectional conduction device and the direct current power supply circuit.

According to a third aspect of the present disclosure, a system for controlling a photovoltaic string is further provided. The system includes the inverter described in the second aspect and at least one photovoltaic string. Each of the at least one photovoltaic string includes multiple photovoltaic modules connected in series and multiple circuit breakers connected to output ends of the multiple photovoltaic modules in one to one correspondence. All of the multiple circuit breakers are connected in series and are connected to a direct current input end of the inverter. Each of the multiple circuit breakers is configured to analyze a control signal outputted by the inverter to obtain a control instruction, and respond to the control instruction.

In an embodiment, for analyzing the control signal outputted by the inverter to obtain the control instruction and respond to the control instruction, the circuit breaker is configured to: determine, when determining that the control signal outputted by the inverter has a first predetermined characteristic waveform, that the control signal is a switch-off control signal, to switch off a photovoltaic module connected to the circuit breaker; and determine, when determining that the control signal outputted by the inverter has a second predetermined characteristic waveform, that the control signal is a switch-on control signal, to switch on the photovoltaic module connected to the circuit breaker.

In an embodiment, each of the multiple photovoltaic modules in the photovoltaic string is provided with a component controller. The component controller is configured to determine, when it is determined that the control signal outputted by the inverter has a third predetermined characteristic waveform, that the control signal is a monitoring signal, to upload state data of the photovoltaic module to the inverter.

A circuit for modulating a control signal, an inverter and a control system are provided according to the present disclosure. The circuit for modulating a control signal is based on a DC/DC boost circuit. The DC/DC boost circuit includes a controllable switch circuit, via which a second capacitor charges a first capacitor. A switch state of the first controllable switch is controlled when a voltage of the first capacitor is greater than or equal to a first voltage threshold, so that the first capacitor generates a control signal with a predetermined characteristic waveform. With this solution, the control signal with the predetermined characteristic waveform is generated by the first capacitor in the DC/DC boost circuit being charged and discharging, without a dedicated signal generator or a power line communication module (PLC), leading to low hardware cost. Moreover, compared with wireless communication, the control signal generated with this solution is not affected by a distance and therefore crosstalk cannot occur, so that there is no special requirement for topography of an installation site.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF EMBODIMENTS

In order to make the purpose, technical solutions and advantages of embodiments of the present disclosure clearer, the technical solutions of embodiments of the present disclosure are described below clearly and completely in conjunction with the drawings of the embodiments of the present disclosure. Apparently, the embodiments described below are only some rather than all of the embodiments of the present disclosure. Any other embodiments obtained by those skilled in the art based on the embodiments in the present disclosure without any creative effort fall within the protection scope of the present disclosure.

Figure 1:
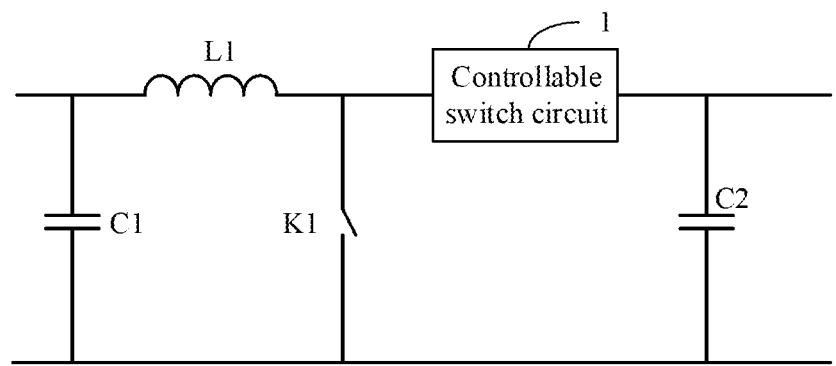
FIG. 1 is a schematic diagram showing circuit for modulating a control signal according to an embodiment of the present disclosure.

Reference is made to FIG. 1, which is a structural schematic diagram showing a circuit for modulating a control signal according to an embodiment of the present disclosure. The circuit is based on a DC/DC boost circuit. As shown in FIG. 1, the circuit includes a DC/DC boost circuit and a control unit.

The DC/DC boost circuit includes a first capacitor C1, a first inductor L1, a first controllable switch K1, a second capacitor C2, and a controllable switch circuit 1 connected in series in a circuit for charging the capacitor C1.

The first capacitor C1 is connected in parallel to an input end of the DC/DC boost circuit. The second capacitor C2 is connected in parallel with an output end of the DC/DC boost circuit. One terminal of the inductor L1 is connected to a positive input port of the DC/DC boost circuit, and the other terminal of the inductor L1 is connected to a positive output port of the DC/DC boost circuit via the controllable switch circuit 1.

One terminal of the first controllable switch K1 is connected to a common terminal of the inductor L1 and the controllable switch circuit 1, and the other terminal of the first controllable switch K1 is connected to a negative input port of the DC/DC boost circuit.

The control unit is configured to control a switch state of the first controllable switch K1 when a voltage of the first capacitor C1 is greater than or equal to a first voltage threshold, so that the first capacitor C1 generates a control signal with a predetermined characteristic waveform. When the first controllable switch K1 is switched on, the first capacitor C1 discharges. When the first controllable switch K1 is switched off, the first capacitor C1 stops discharging. The predetermined characteristic waveform is generated by the first capacitor C1 by controlling at least one of a duty cycle of a signal for controlling the first controllable switch and a frequency for controlling the first controllable switch K1 to be switched on or off.

In an application scenario, the voltage of the first capacitor C1 decreases as the first capacitor C1 discharges. When the voltage of the first capacitor C1 is less than a threshold, the first capacitor C1 cannot generate the control signal with the predetermined characteristic waveform. In this case, it is required to charge the first capacitor C1 to increase the voltage of the first capacitor C1. In this embodiment, a branch, in the controllable switch circuit 1, for the second capacitor C2 to charge the first capacitor C1 is controlled to be switched on, so that the second capacitor C2 charges the first capacitor C1. When charging the first capacitor C1, a voltage of the second capacitor C2 decreases, so that the voltage of the second capacitor C2 is released, thereby reducing a risk of overvoltage of the second capacitor C2.

In an embodiment, the voltage of the first capacitor C1 is detected. The branch, in the controllable switch circuit 1, for the second capacitor C2 to charge the first capacitor C1 is controlled to be switched on when the voltage on the first capacitor C1 is less than the first voltage threshold, so that the second capacitor C2 charges the first capacitor C1.

In another embodiment, every time the first controllable switch K1 is controlled to be switched off, the branch, in the controllable switch circuit 1, for the second capacitor C2 to charge the first capacitor C1 is controlled to be switched on, so that the first capacitor C1 discharges and is charged alternately, thereby preventing the voltage of the first capacitor C1 from being too low to generate the preset characteristic waveform.

The circuit for modulating a control signal according to the embodiment is based on a DC/DC boost circuit. The DC/DC boost circuit includes a controllable switch circuit, via which the second capacitor charges the first capacitor. The switch state of the first controllable switch is controlled when the voltage of the first capacitor is greater than or equal to the first voltage threshold, so that the first capacitor generates the control signal with the predetermined characteristic waveform. With this solution, the control signal with the predetermined characteristic waveform is generated by the first capacitor in the DC/DC boost circuit being charged and discharging. Therefore, neither a dedicated signal generator nor a PLC communication module is required, leading to low hardware cost. Moreover, compared with wireless communication, the control signal generated with this solution is not affected by a distance and therefore crosstalk cannot occur, so that there is no special requirement for topography of an installation site.

Figure 2:
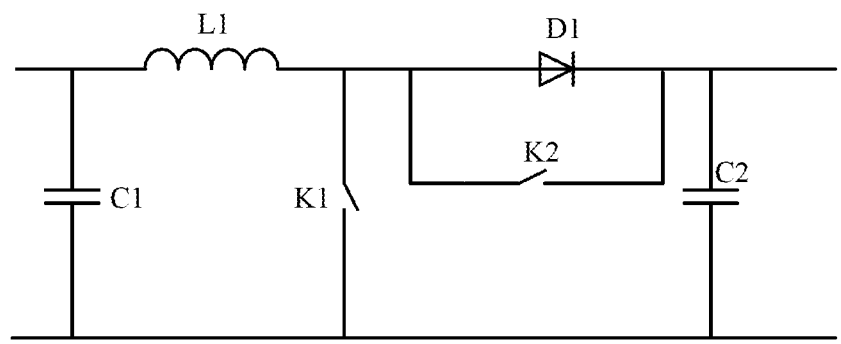
FIG. 2 is a schematic diagram showing a circuit for modulating a control signal according to another embodiment of the present disclosure.

Reference is made to FIG. 2, which is a schematic diagram showing a circuit for modulating a control signal according to another embodiment of the present disclosure. The circuit is based on a typical boost circuit.

As shown in FIG. 2, the typical boost circuit includes a first capacitor C1, a first inductor L1, a first controllable switch K1, a first unidirectional conduction device D1 and a second capacitor C2. The first capacitor C1 is connected in parallel with an input end of the boost circuit, and the second capacitor C2 is connected in parallel with an output end of the boost circuit. The first inductor L1 and the first unidirectional conduction device D1 are connected in series between a positive input port and a positive output port of the boost circuit. One terminal of the first controllable switch K1 is connected to a common terminal of the first inductor L1 and the first unidirectional conduction device D1, and the other terminal of the first controllable switch K1 is connected to a negative input port of the boost circuit. A second controllable switch K2 is connected in parallel with the first unidirectional conduction device D1.

The boost circuit is also known as a boost step up circuit, which is a switch direct current boost circuit and is capable of increasing an input voltage.

The second controllable switch K2 is added to the typical boost circuit. In an embodiment, the second controllable switch K2 is connected in parallel with the first unidirectional conduction device D1. That is, the second controllable switch K2 and the first unidirectional conduction device D1 form the controllable switch circuit 1 in the embodiment shown in FIG. 1.

The second controllable switch K2 is configured to provide a branch for the second capacitor C2 to charge the first capacitor C1. The second controllable switch K2 is controlled to be switched on when the voltage of the first capacitor C1 is less than the first voltage threshold. In this case, energy of the second capacitor C2 flows to the first capacitor C1 via the second controllable switch K2 and the first inductor L1, that is, the second capacitor C2 charges the first capacitor C1. When the voltage of the first capacitor C1 reaches the first voltage threshold, the first capacitor C1 is controlled to be charged or to discharge by controlling the switch state of the first controllable switch K1 to be switched on or switched off, so that first capacitor C1 generates a voltage signal with the predetermined characteristic waveform.

The first voltage threshold is determined based on a parameter of the first capacitor C1. When the voltage of the first capacitor C1 reaches the first voltage threshold and a control signal is required, the first controllable switch K1 is controlled to be switched on, so that the first capacitor C1 discharges and the voltage of the first capacitor C1 decreases. The switch state of the first controllable switch K1 is controlled based on a preset duty cycle of a signal and a preset frequency, so that the first capacitor C1 generates a control signal with a preset characteristic waveform.

In the photovoltaic field, a direct current power supply connected to the input end of the boost circuit is usually a photovoltaic string. In a case that the photovoltaic string is switched on, the first capacitor C1 is charged by the photovoltaic string, so that the voltage of the first capacitor C1 increases. Alternatively, the second controllable switch K2 is controlled to be switched on, so that the first capacitor C1 is charged by the second capacitor C2. The second capacitor C2 charges the first capacitor C1 as long as the voltage of the second capacitor C2 is greater than the voltage of the first capacitor C1, regardless of whether the photovoltaic string on the direct current side is switched on.

It should be noted that the second controllable switch K2 is controlled to be switched on when the voltage of the first capacitor C1 is less than the first voltage threshold, so that the first capacitor C1 is charged by the second capacitor C2. Alternatively, every time the first controllable switch K1 is controlled to be switched off, the second controllable switch K2 is controlled to be switched on, so that the first capacitor C1 is charged by the second capacitor C2.

In another application scenario of the present disclosure, when controlling the switch state of the first controllable switch K1, the voltage of the second capacitor C2 may exceed a safety threshold. In this case, the second controllable switch K2 is controlled to be switched on, to release the voltage of the second capacitor C2, so as to reduce the risk of overvoltage of the second capacitor C2.

Figure 3:
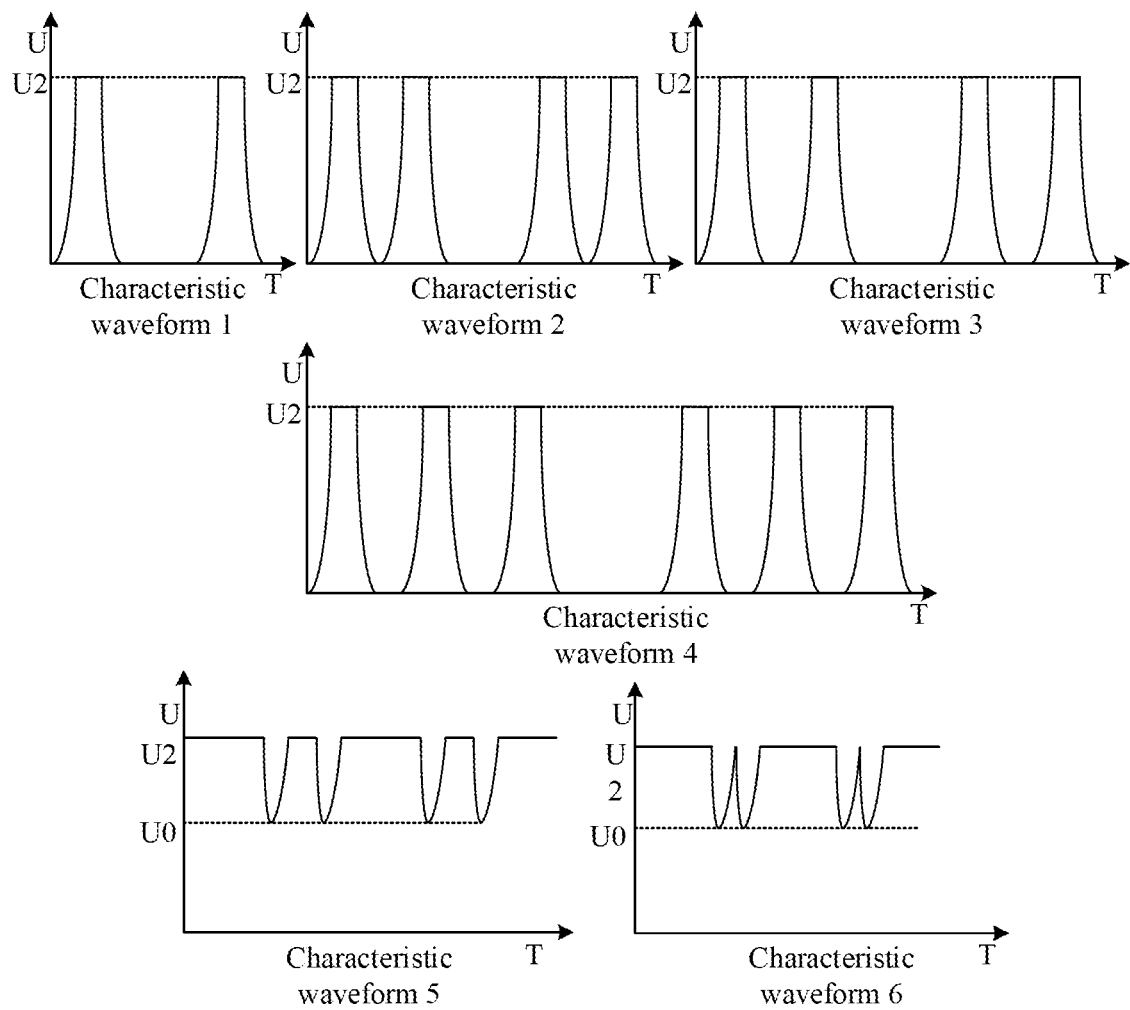
FIG. 3 is a schematic diagram showing six characteristic waveforms according to an embodiment of the present disclosure.

FIG. 3 shows six characteristic waveforms according to an embodiment of the present disclosure. Apparently, other characteristic waveforms can be obtained and are not shown in the present disclosure.

The characteristic waveform varies with the control signal. The corresponding relationship between a control signal and its characteristic waveform is pre-determined and stored in the control unit. When a control signal is required, a characteristic waveform corresponding to the control signal is obtained based on the corresponding relationship, and then the control signal having the characteristic waveform is generated.

Figure 4:
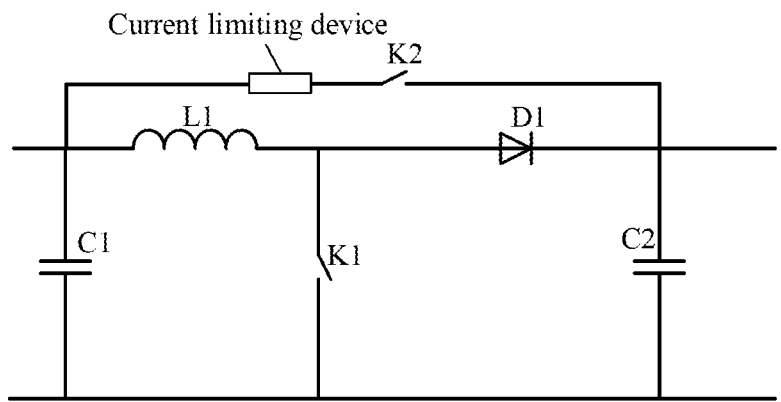
FIG. 4 is a schematic diagram showing a circuit for modulating a control signal according to another embodiment of the present disclosure.

In another embodiment of the present disclosure, as shown in FIG. 4, the second controllable switch K2 is connected in parallel with a branch formed by connecting the first inductor L1 in series with the first unidirectional conducting device D1. The circuit shown in FIG. 4 operates in the same way as the circuit shown in FIG. 1, and is not repeated herein.

In addition, an inrush current is generated at a time instant at which the second controllable switch K2 is switched on, which reduces a service life of the switch. In another embodiment of the present disclosure, as shown in FIG. 4, a current limiting device such as a resistor or an inductor is connected in series with the second controllable switch K2 so as to reduce the inrush current generated at the time instant at which the second controllable switch K2 is switched on. Apparently, the circuit according to the embodiment shown in FIG. 2 may further include a current limiting device connected in series with the second controllable switch K2, which is not described in detail herein.

Figure 5:
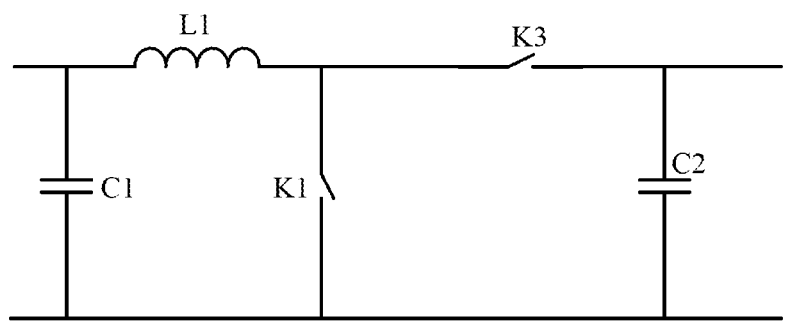
FIG. 5 is a schematic diagram showing a circuit for modulating a control signal according to another embodiment of the present disclosure.

In another embodiment of the present disclosure, as shown in FIG. 5, the controllable switch circuit is implemented by a third controllable switch K3. The first controllable switch K1 and the third controllable switch K3 in this embodiment respectively operate in the same way as the first controllable switch K1 and the second controllable switch K2 in FIGS. 2 and 4, and are not be described in detail here.

The circuit for modulating a control signal according to the embodiment is based on the typical boost circuit. A second controllable switch is added to the typical boost circuit. The second controllable switch is controlled to be switched on when the voltage on the first capacitor is less than the first voltage threshold, so that the first capacitor is charged by the second capacitor until the voltage on the first capacitor reaches the first voltage threshold. The switch state of the first controllable switch is controlled, so that the first capacitor generates the control signal with the predetermined characteristic waveform. With this solution, the control signal with the predetermined characteristic waveform is generated by the first capacitor in the boost circuit being charged and discharging. Therefore, neither a signal generator nor a PLC communication module is required, leading to low hardware cost. Moreover, compared with the wireless communication, the control signal generated with this solution is not affected by a distance and therefore crosstalk cannot occur, so that there is no special requirement for topography of an installation site.

In the above embodiments, the second capacitor C2 charges the first capacitor C1 in the DC/DC boost circuit, so that the voltage on the first capacitor C1 reaches a voltage required for generating the predetermined characteristic waveform. In another embodiment of the present disclosure, the first capacitor C1 is charged by a direct current power supply circuit.

Figure 6:
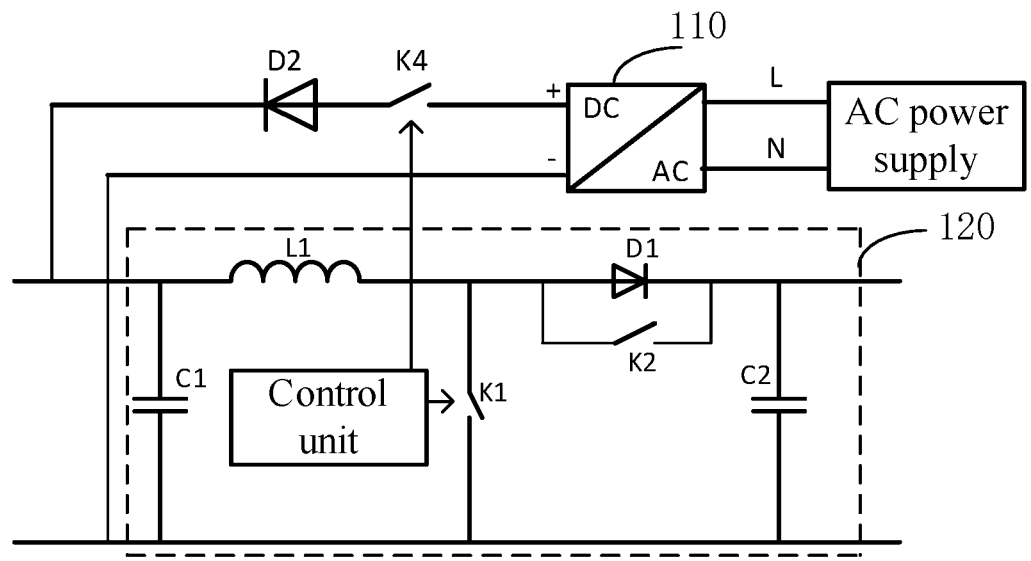
FIG. 6 is a schematic diagram of showing a circuit for modulating a control signal according to another embodiment of the present disclosure.

Reference is made to FIG. 6, Which is a schematic diagram showing a circuit for modulating a control signal according to another embodiment of the present disclosure. The circuit according to this embodiment is based on the DC/DC boost circuit. Different from the embodiments shown in FIGS. 2, 4 and 5, the first capacitor C1 in this embodiment is charged by a direct current power supply circuit.

As shown in FIG. 6, the circuit for modulating a control signal includes a direct current power supply circuit 110, a second unidirectional conduction device D2, a fourth controllable switch K4, a DC/DC boost circuit 120 and a control unit.

The DC/DC boost circuit 120 in this embodiment adopts any one of DC/DC boost topologies shown in FIGS. 2, 4 and 5, and these boost topologies are not repeated herein. A case in which the DC/DC boost circuit 120 is implemented by the circuit shown in FIG. 2 is taken as an example for description in this embodiment.

An output port of the direct current power supply circuit 110 is connected in series with the fourth controllable switch K4 and the second unidirectional conduction device D2 sequentially, and is connected to an input port of the DC/DC boost circuit 120.

In this embodiment, the second unidirectional conduction device D2 is configured to cause electric energy outputted by the direct current power supply circuit to flow to the input end of the DC/DC boost circuit, thereby preventing energy from flowing from the DC/DC boost circuit to the direct current power supply circuit.

In an embodiment of the present disclosure, the direct current power supply circuit 110 is implemented by an inverter circuit, and an alternating current side of the inverter circuit is connected to an alternating current power supply.

When the voltage of the first capacitor C1 is greater than or equal to the first voltage threshold, at least one of a duty cycle of a signal for controlling first controllable switch K1 and a frequency for controlling the first controllable switch K1 is controlled, so that the first capacitor generates a control signal with a predetermined characteristic waveform.

In an embodiment of the present disclosure, when the voltage of the first capacitor C1 is less than the first voltage threshold, the fourth controllable switch K4 is controlled to be switched on, so that the first capacitor C1 is charged by the direct current power supply circuit 110.

In another embodiment of the present disclosure, the fourth controllable switch K4 is controlled to be switched on when the first controllable switch K1 is controlled to be switched off, so that the direct current power supply circuit charges the first capacitor C1.

In another embodiment of the present disclosure, in order to prevent the voltage of the second capacitor C2 from exceeding the safety threshold, the second controllable switch K2 is controlled to be switched on when it is detected that the voltage of the second capacitor C2 is greater than a second voltage threshold, so that the second capacitor C2 discharges, so as to reduce the risk of overvoltage of the second capacitor C2.

Alternatively, in other embodiments, a direct current load (such as a fan) in the circuit is controlled to operate when the voltage on the second capacitor C2 exceeds the second voltage threshold, to consume the energy of the second capacitor C2, so as to reduce the risk of overvoltage of the second capacitor C2.

In an embodiment of the present disclosure, in an application scenario where the circuit for modulating a control signal is applied to an inverter, the direct current power supply circuit 110 is implemented by a power supply circuit in the inverter. For example, the direct current power supply circuit 110 is implemented by a power supply circuit configured to supply power to a direct current load (such as a fan) of the inverter. A supply voltage of the power supply circuit is +24V or the like. Alternatively, in other embodiments, the direct current power supply circuit 110 is implemented by a direct current power supply circuit rather than a direct current power supply in the inverter, which is not described in detail herein.

In the circuit for modulating a control signal according to this embodiment, the first capacitor C1 is charged by a direct current power supply circuit. When the voltage of the first capacitor is less than the first voltage threshold, the fourth controllable switch circuit is controlled to be switched on, so that the first capacitor is charged by the direct current power supply circuit. When the voltage of the first capacitor reaches the first voltage threshold, the switch state of the first controllable switch is controlled, so that the first capacitor discharges or is charged, to generate the control signal with the predetermined characteristic waveform on. With this solution, the direct current power supply circuit charges the first capacitor without affecting the second capacitor C2, thereby improving reliability of the DC/DC boost circuit.

According to another aspect of the embodiments of the present disclosure, an inverter to which the above circuit for modulating a control signal is applied is provided.

Figure 7:
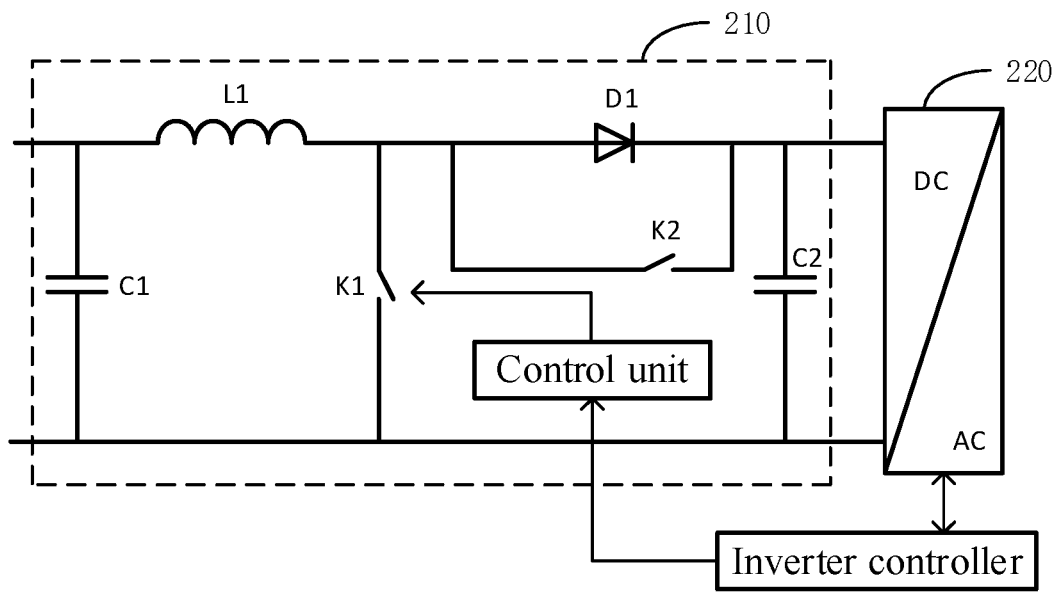
FIG. 7 is a structural schematic diagram showing an inverter according to an embodiment of the present disclosure.

Reference is made to FIG. 7, which is a structural schematic diagram showing an inverter according to an embodiment of the present disclosure. A single-input inverter is taken as an example for description in this embodiment.

As shown in FIG. 7, the inverter includes a circuit 210 for modulating a control signal, an inverter circuit 220 and an inverter controller.

The circuit 210 for modulating a control signal is implemented by adding a second controllable switch K2 to a boost circuit of the inverter. That is, the circuit 210 for modulating a control signal is implemented by the circuit shown in FIG. 2. The boost circuit includes a first capacitor C1, a first inductor L1, a first controllable switch K1, a first unidirectional conduction device D1, and a second capacitor C2.

In this embodiment, the second controllable switch K2 is connected in parallel with the first unidirectional conduction device D1 in the boost circuit. An output end of the boost circuit is connected to a direct current end of the inverter circuit 220. An input end of the boost circuit is configured to connect a photovoltaic string.

The inverter controller is configured to acquire a control signal generation instruction and transmit the control signal generation instruction to the control unit in the circuit for modulating a control signal.

The control unit is configured to control the second controllable switch K2 to be switched off when a voltage of the first capacitor C1 is greater than or equal to a first voltage threshold, and control a switch state of the first controllable switch K1 so that the first capacitor C1 generates a control signal with a predetermined characteristic waveform.

The control signal is analyzed by a control module in the photovoltaic string to obtain a control instruction, and the control instruction is executed by the control module.

The control unit is further configured to control the second controllable switch K2 to be switched on when the voltage of the first capacitor C1 is less than the first voltage threshold, so that the second capacitor C2 charges the first capacitor C1.

In addition, the control unit is integrated in the inverter controller. Alternatively, the control unit is separated from the inverter controller.

In an application scenario, the inverter is required to generate a control signal for controlling the photovoltaic module to be switched on or switched off. In this application scenario, the control unit operates as follows.

In a case that the photovoltaic string is switched on, the voltage across the first capacitor C1 is equal to a voltage U1 across the photovoltaic string, and the voltage U1 is greater than zero. In this case, when the inverter controller acquires a switch-off instruction (for example, generated when it is detected that an external DI interface receives a trigger signal generated by a button), the inverter is shut down. In addition, the inverter controller generates a switch-off signal generation instruction and transmits the switch-off signal generation instruction to the control unit in the circuit for modulating a control signal. When receiving the switch-off signal generation instruction, the control unit controls the second controllable switch K2 to be switched off and controls the first controllable switch K1 to be switched on. Since the first capacitor C1 is connected in parallel between positive and negative ports of the photovoltaic string, and the first inductor L1 is connected in parallel with the first capacitor C1, the first capacitor C1 discharges via the first inductor L1 and therefore the voltage of the first capacitor C1 decreases. When the first controllable switch K1 is switched off the photovoltaic string charges the first capacitor C1 and therefore the voltage of the first capacitor C1 increases. Alternatively, the control unit controls the second controllable switch K2 to be switched on, so that the second capacitor C2 charges the first capacitor C1, and therefore the voltage of the first capacitor C1 increases. By controlling the switch state of the first controllable switch K1 based on a predetermined duty cycle and at a predetermined frequency, the first capacitor C1 generates a switch-off control signal with a first predetermined characteristic waveform.

In a case that the photovoltaic string is switched off, the voltage of the first capacitor C1 approximates zero. When receiving a switch-on instruction, the inverter controller generates a switch-on signal generation instruction and transmits the switch-on signal generation instruction to the control unit. Since the photovoltaic string is switched off, the first capacitor C1 cannot be charged by the photovoltaic string. Therefore, when the control unit receives the switch-on signal instruction, a direct current bus is pre-charged by a grid on the alternating current side to increase a voltage of the direct current bus. Then, the first controllable switch K1 is controlled to be switched off and the second controllable switch K2 is controlled to be switched on. In this case, the second capacitor C2 charges the first capacitor C1. When the voltage on the first capacitor C1 reaches the first voltage threshold, the switch state of the first controllable switch K1 is controlled, so that the first controllable switch C1 generates a switch-on control signal with a second predetermined characteristic waveform.

The switch-off control signal may have any one of the characteristic waveforms shown in FIG. 3. Alternatively, the switch-off control signal has another characteristic waveform not shown in FIG. 3. The switch-on control signal has a characteristic waveform different from the characteristic waveform of the switch-off control signal, which is not limited in the present disclosure.

In another embodiment of the present disclosure, in order to reduce an inrush current generated at a time instant when the second controllable switch K2 is switched on, a current limiting device such as a resistor or an inductor is connected in series with the second controllable switch K2.

Figure 8:
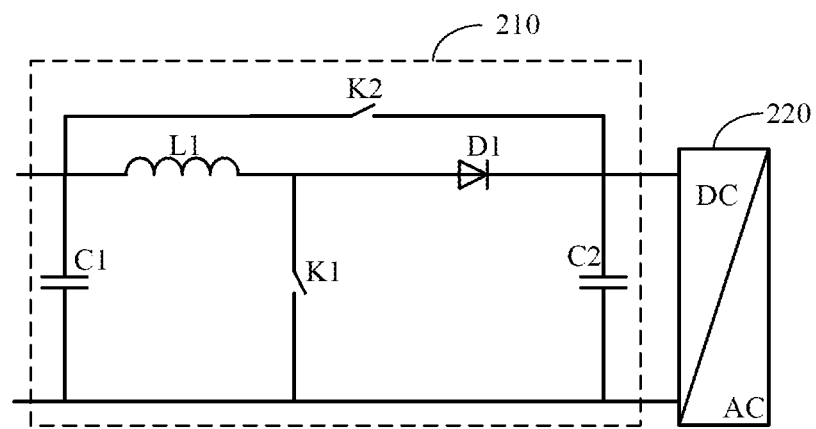
FIG. 8 is a structural schematic diagram showing an inverter according to another embodiment of the present disclosure.

In another embodiment of the present disclosure, as shown in FIG. 8, the second controllable switch K2 (or a branch formed by connecting the second controllable switch K2 in series with the current limiting device) is connected in parallel with the a branch formed by connecting the first inductor L1 is series with the unidirectional conduction device D1. Generation of the control signal in the embodiment shown in FIG. 8 is the same as the generation of the control signal by the inverter shown in FIG. 7, and is not described in detail herein.

In another application scenario of the present disclosure, the inverter includes multiple direct current input ends. A case in which the inverter includes two direct current input ends is taken as an example for description below.

Figure 9:
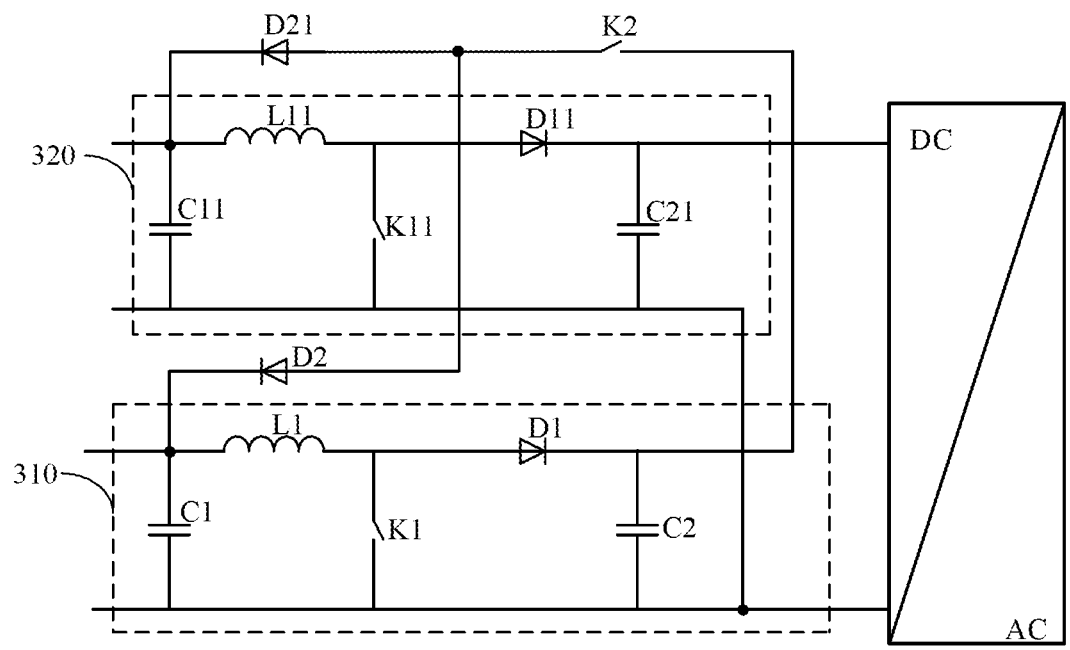
FIG. 9 is a structural schematic diagram showing an inverter according to another embodiment of the present disclosure.

As shown in FIG. 9, an output end of a boost circuit is connected in parallel with an output end of another boost circuit. That is, a positive output port and a negative output port of a first boost circuit 310 are connected to a positive output port and a negative output port of a second boost circuit 320, respectively. Moreover, the two boost circuits share a controllable switch K2 (that is, the second controllable switch) and a current limiting device.

One terminal of the controllable switch K2 is connected to the positive output port of the first boost circuit 310 and the positive output port of the second boost circuit 320, and the other terminal of the second controllable switch K2 is connected to a positive input port of the first boost circuit 310 via a second unidirectional conducting device D2, and is thither connected with a positive input port of the second boost circuit 320 via a second unidirectional conducting device D21.

Figure 10:
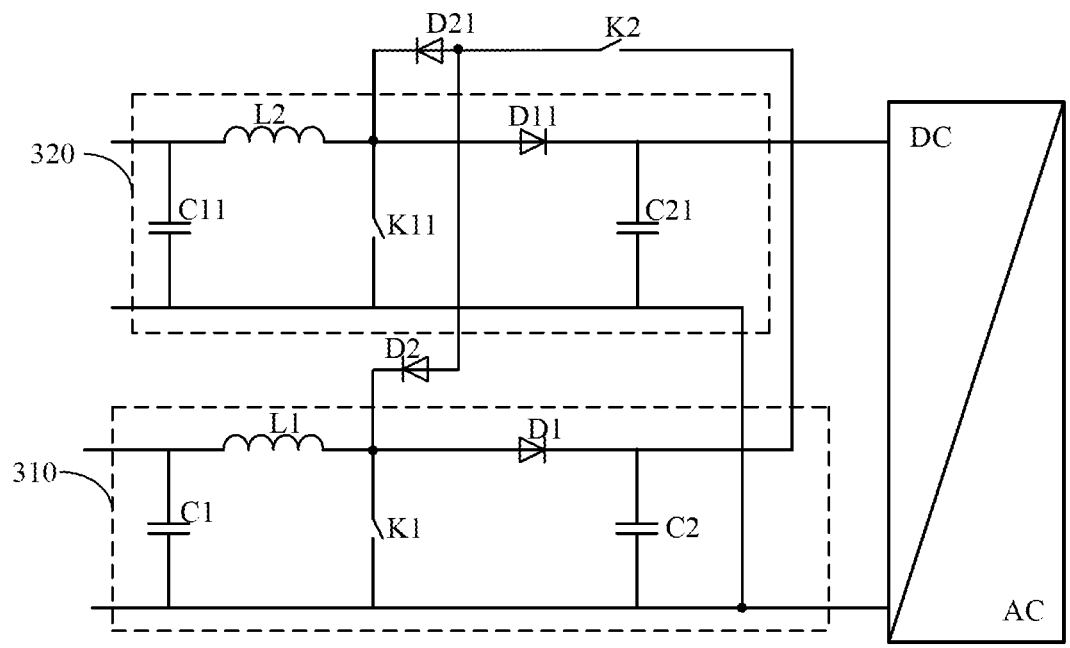
FIG. 10 is a structural schematic diagram showing an inverter according to another embodiment of the present disclosure.

In another embodiment of the present disclosure, the second controllable switch K2 is connected in parallel with a first unidirectional conduction device of each boost circuit. As shown in FIG. 10, one terminal of the second controllable switch K2 is connected to a positive output port of each boost circuit, and the other terminal of the second controllable switch K2 is connected with a common terminal of a first inductor L1 and a first unidirectional conducting device D1 in the first boost circuit 310 via the second unidirectional conducting device D2, and is further connected to a common terminal of a first inductor L2 and a first unidirectional conducting device D11 in the second boost circuit 320 via the second unidirectional conducting device D21.

The second unidirectional conducting devices D2 and D21 in FIGS. 9 and 10 are unidirectionally conductive, so that energy only flows from the second capacitor C2 to the first capacitor C1 and flows from the second capacitor C21 to the first capacitor C11, thereby preventing electric energy in one boost circuit from flowing to another boost circuit.

In the inverter circuits shown in FIGS. 9 and 10, the boost circuits share the second controllable switch K2 and the current limiting device, thereby further reducing the hardware cost.

In the inverter according to the embodiment, the first capacitor connected in series with the input end of the boost circuit generates a control signal a predetermined characteristic waveform by controlling the switch state of the controllable switch in the boost circuit. When the voltage of the first capacitor is less than the first voltage threshold, the second controllable switch is controlled to be switched on, so that the first capacitor is charged by the second capacitor, ensuring that the characteristic waveform generated by the first capacitor is not affected. With this solution, a control signal is generated by the improved boost circuit and is transmitted by an existing transmission line. With this solution, transmission of the control signal is not affected by a distance and therefore crosstalk does not occur, so that there is no special requirement for topography of an installation site. In addition, neither a PLC communication module nor a signal generator is required, leading to low hardware cost.

An inverter to which the circuit for modulating a control signal shown in FIG. 6 is applied is further provided according to an embodiment of the present disclosure.

Figure 11:
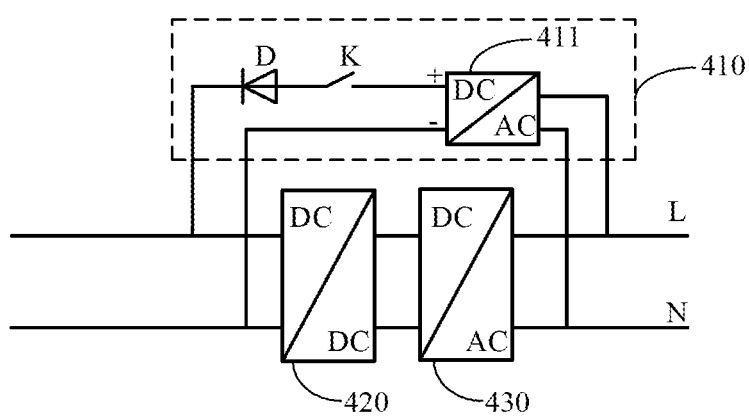
FIG. 11 is a structural schematic diagram showing an inverter according to another embodiment of the present disclosure.

Reference is made to FIG. 11, which is a structural schematic diagram showing an inverter according to another embodiment of the present disclosure. The inverter includes a circuit 410 for modulating a control signal, a boost circuit 420 and an inverter circuit 430.

The circuit for modulating a control signal 410 includes a direct current power supply circuit 411, a controllable switch K, a third unidirectional conduction device D and a control unit.

A direct current output port of the direct current power supply circuit 411 is connected in series with the controllable switch K and the third unidirectional conduction device D sequentially, and is connected to a direct current input port of the boost circuit 420. An alternating current end of the direct current power supply circuit 411 is configured to connect with an alternating current power supply.

A first controllable switch K1 in the DC/DC boost circuit 420 is controlled by a control unit, so that a first capacitor in the DC/DC boost circuit 420 generates a control signal with a predetermined characteristic waveform.

When a voltage of the first capacitor C1 in the DC/DC boost circuit 420 is less than a first voltage threshold or when the first controllable switch K1 in the DC/DC boost circuit 420 is controlled to be switched off, the controllable switch K is controlled to be switched on, so that the first capacitor C1 is charged by the direct current power supply circuit 411, so as to increase the voltage of the first capacitor C1.

The control unit of the circuit for modulating a control signal in this embodiment is integrated in the inverter controller or separated from the inverter controller.

In the inverter according to this embodiment, the direct current power supply circuit charges the first capacitor. When the voltage of the first capacitor is less than the first voltage threshold, a fourth controllable switch circuit is controlled to be switched on, so that the first capacitor is charged by the direct current power supply circuit. When the voltage of the first capacitor reaches the first voltage threshold, a switch state of the first controllable switch is controlled so that the first capacitor discharges or is charged, so as to generate a control signal with a predetermined characteristic waveform. With this solution, the direct current power supply circuit charges the first capacitor without affecting the second capacitor, thereby improving reliability of the inverter.

According to another aspect of the embodiments of the present disclosure, a system for controlling a photovoltaic string is further provided.

Figure 12:
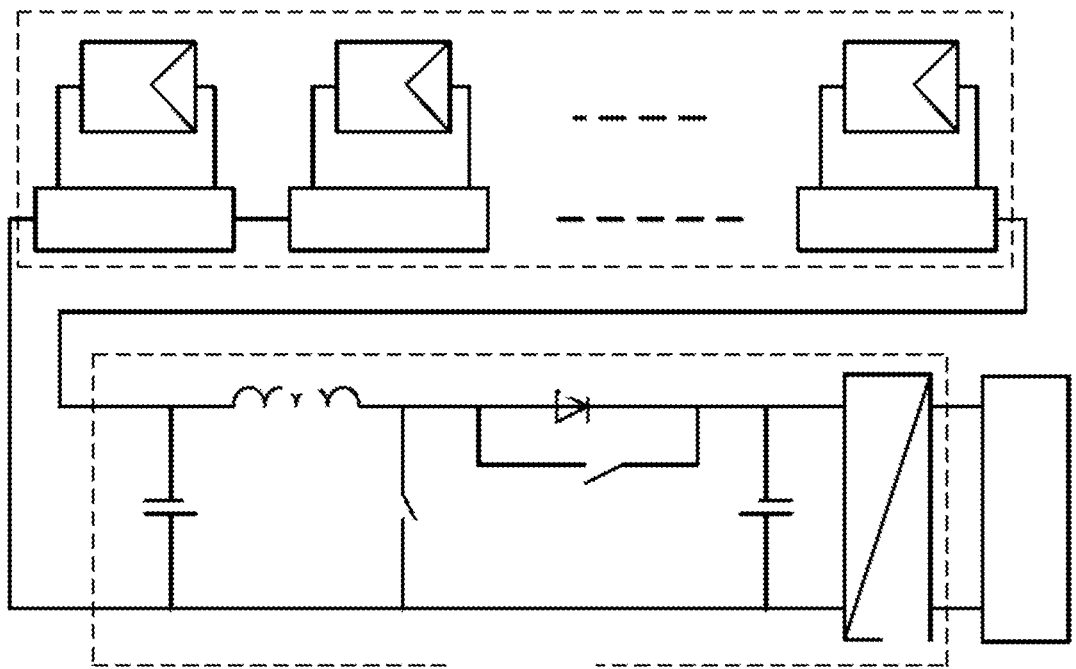
FIG. 12 is a structural schematic diagram showing a system for controlling a photovoltaic string according to an embodiment of the present disclosure.

Reference is made to FIG. 12, which is a structural schematic diagram showing a system for controlling a photovoltaic string according to an embodiment of the present disclosure. In the embodiment, the photovoltaic string is controlled by the inverter shown in FIG. 7.

As shown in FIG. 12, the system for controlling a photovoltaic string includes an inverter 610 and a photovoltaic string 620.

The photovoltaic string 620 includes n photovoltaic modules PV1 to PVn connected in series, and n circuit breakers RSD1 to RSDn respectively connected to output ends of the n photovoltaic modules.

The n photovoltaic modules are connected in series sequentially by connecting the n RSDs (Rapid Shutdowns) in series sequentially.

The n circuit breakers in the photovoltaic string 620 are connected in series to the direct current end of the inverter 610. Each of the n circuit breakers is configured to receive a control signal outputted by the inverter, analyze the control signal to obtain a control instruction and respond to the control instruction.

Figure 13:
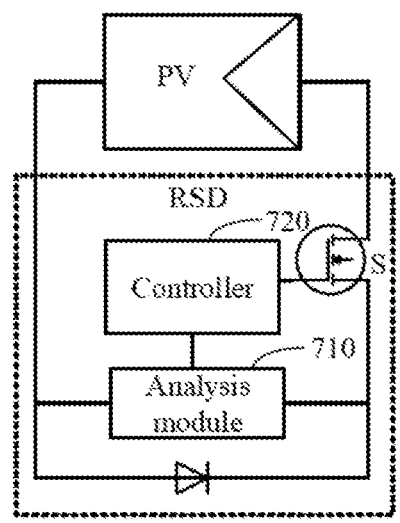
FIG. 13 is a structural schematic diagram showing an internal structure of a circuit breaker according to an embodiment of the present disclosure.

FIG. 13 is a structural schematic diagram showing an internal structure of a circuit breaker. The circuit breaker includes an analysis module 710, a controller 720, and a switch transistor S.

In an application scenario where a photovoltaic module is controlled to be switched on or switched off, the circuit breaker operates as follows.

In a case that the analysis module 710 analyzes that the control signal outputted by the inverter has the first predetermined characteristic waveform, it is determined that the control signal is a switch-off control signal and the controller 720 controls the switch transistor S to be switched off, so as to disconnect a photovoltaic module connected to the switch transistor S from the inverter.

In a case that the analysis module 710 analyzes that the control signal outputted by the inverter has the second determined characteristic waveform it is determined that the control signal is a switch-on control signal and the controller 720 controls the switch transistor S to be switched on, so as to connect a photovoltaic module connected to the switch transistor S to the inverter.

In another embodiment of the present disclosure, a controller in each of the n photovoltaic modules is configured to receive a control signal transmitted by the inverter. When it is determined that the control signal outputted by the inverter has the third predetermined characteristic waveform, it is determined that the control signal is a monitoring signal and state data of a corresponding photovoltaic module is uploaded to the inverter.

In other embodiments of the present disclosure, the system for controlling a photovoltaic module is further configured to control the photovoltaic module based on another inverter (such as the inverters shown in FIGS. 8 to 11) according to the present disclosure. A process of analyzing the control signal transmitted by the inverter at the photovoltaic module side is similar to the above analysis process, and is not described in detail herein.

The system for controlling a photovoltaic module according to this embodiment generates a control signal by the improved circuit in the inverter and transmits the control signal to the photovoltaic module. The photovoltaic module analyzes the received control signal to obtain a control instruction corresponding to the control signal, and respond to the control instruction. In the system, the transmission of the control signal is not affected by a distance and crosstalk does not occur, so that there is no special requirement for topography of an installation site. In addition, neither a PLC communication module nor a signal generator is required, leading to low hardware cost.

In the method embodiments described above, the method is described as a combination of a series of steps for simplicity of the description. However, those skilled in the art should understand that the present disclosure is not limited to a described order of the steps. Some steps may be performed in other order or in parallel according to the present disclosure. In addition, those skilled in the art should also understand that the embodiments described in the specification are preferred embodiments, and the steps and modules described are not necessarily required by the present disclosure.

It should be noted that the embodiments in this specification are described in a progressive way, each of which emphasizes the differences from others, and for the same or similar parts among the embodiments, one may refer to description of other embodiments. Since the device disclosed in the embodiments is basically similar to the method therein, the description of the device is relatively simple, and for relevant matters, one may refer to the description of the method embodiments.

The steps in the method according to the embodiments of the present disclosure may be adjusted, merged or deleted according to actual needs.

The modules and sub-modules in the device and the terminal according to the embodiments of the present disclosure may be merged, divided or deleted according to actual needs.

In the embodiments according to the present disclosure, it should be understood that the disclosed terminal, device and method may be implemented in other means. For example, the terminal embodiment described above is only for illustration. For example, modules or sub-modules are divided only according to logical functions, and the modules or sub-modules may be divided in other manner in actual implementation. For example, multiple sub-modules or modules may be combined or integrated into another module, or some features may be ignored or not implemented. In addition, the shown or described mutual coupling, direct coupling, or communication connection may be indirect coupling or communication connection through some interfaces, devices or modules, which may be electrical, mechanical or in other form.

The modules or sub-modules described as separated components may be or may not be physically separated. Components described as modules or sub-modules may be or may not be physical modules or sub-modules. That is, the components may be arranged in one place, or may be distributed in multiple network modules or sub-modules. Some or all of the modules or sub-modules may be selected according to actual needs to realize the purpose of the solutions of the embodiments.

In addition, various functional modules or sub-modules in each embodiment of the present disclosure may be integrated in a processing module. Alternatively, the various functional modules or sub-modules may be physically separated. Alternatively, two or more modules or sub-modules may be integrated in one module. The above integrated modules or sub-modules can be implemented as hardware, software function modules or sub-modules.

Finally, it should further be noted that in the present disclosure, relational terms such as "first" and "second" are merely used to distinguish one entity or operation from another entity or operation, but do not indicate or imply an actual relationship or order of these entities or operations. In addition, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

With the description of the embodiments disclosed above, those skilled in the art can implement or use the technical solutions of the present disclosure. Numerous modifications to the embodiments are apparent to those skilled in the art, and the general principles defined herein may be implemented in other embodiments without departing from the spirit or scope of the present disclosure. Therefore, the present disclosure is not limited to the embodiments described herein, but should comply with the widest scope consistent with the principles and novel features disclosed herein.

Only preferred embodiments of the present disclosure are described above. It should be noted that for those skilled in the art, various improvements and modifications may be made without departing from the principle of the present disclosure, and the improvements and modifications should be regarded as falling within the protection scope of the present disclosure.

The invention claimed is:

1. A circuit for modulating a control signal, comprising:
a direct current to direct current (DC/DC) boost circuit; and
a control unit, wherein
the DC/DC boost circuit comprises a first capacitor, a first inductor, a first controllable switch, a second capacitor, and a controllable switch circuit, wherein
the first capacitor is connected in parallel with an input end of the DC/DC boost circuit;
the second capacitor is connected in parallel with an output end of the DC/DC boost circuit;
a terminal of the first inductor is connected to a positive input port of the DC/DC boost circuit, and another terminal of the first inductor is connected to a positive output port of the DC/DC boost circuit via the controllable switch circuit;
a terminal of the first controllable switch is connected to a common terminal of the first inductor and the controllable switch circuit, and another terminal of the first controllable switch is connected to a negative input port; and
the control unit is configured to control, when a voltage of the first capacitor is greater than or equal to a first voltage threshold, at least one of a duty cycle of a signal for controlling the first controllable switch and a frequency for controlling the first controllable switch, to control the first capacitor to generate a control signal with a predetermined characteristic waveform.

2. The circuit according to claim 1, wherein the controllable switch circuit comprises a first unidirectional conduction device and a second controllable switch, wherein
an anode of the first unidirectional conduction device is connected to the first inductor, and a cathode of the first unidirectional conduction device is connected to a negative output port of the DC/DC boost circuit; and
the second controllable switch is connected in parallel with the first unidirectional conduction device, or the second controllable switch is connected in parallel with a branch formed by connecting the first inductor in series with the first unidirectional conduction device.

3. The circuit according to claim 2, wherein the controllable switch circuit further comprises a current limiting device connected in series with the second controllable switch.

4. The circuit according to claim 1, wherein the controllable switch circuit comprises a third controllable switch connected in series with the first inductor.

5. The circuit according to claim 1, wherein the control unit is further configured to:
control the controllable switch circuit to be switched on when the voltage of the first capacitor is greater than or equal to the first voltage threshold, to charge the first capacitor by the second capacitor; or
control the controllable switch circuit to be switched on when the first controllable switch is controlled to be switched off, to charge the first capacitor by the second capacitor.

6. The circuit according to claim 1, wherein the control unit is further configured to:
control the controllable switch circuit to be switched on when a voltage of the second capacitor is greater than or equal to a second voltage threshold, to control the second capacitor to discharge.

7. The circuit according to claim 1, further comprising:
a direct current power supply circuit;
a fourth controllable switch; and
a second unidirectional conduction device, wherein
an output port of the direct current power supply circuit is connected in series with the fourth controllable switch and the second unidirectional conduction device sequentially, and is connected to the input end of the DC/DC boost circuit; and an alternating current end of the direct current power supply circuit is configured to connect with an alternating current power supply;
the second unidirectional conduction device is configured to cause electric energy outputted by the direct current power supply circuit to flow to the input end of the DC/DC boost circuit, and wherein the control unit is further configured to:

control the fourth controllable switch to be switched on when the voltage of the first capacitor is less than or equal to the first voltage threshold, to charge the first capacitor by the direct current power supply circuit; or control the fourth controllable switch to be switched on when the first controllable switch is controlled to be switched off, to charge the first capacitor by the direct current power supply circuit.

8. An inverter, comprising an inverter circuit, an inverter controller and the circuit for modulating a control signal according to claim 1, wherein the output end of the DC/DC boost circuit is connected to a direct current end of the inverter circuit, and the input end of the DC/DC boost circuit is configured to connect a photovoltaic string; and the inverter controller is configured to: acquire a control signal generation instruction; and transmit the control signal generation instruction to the control unit of the circuit for modulating a control signal, wherein the control unit controls the first capacitor to generate the control signal with the predetermined characteristic waveform.

9. The inverter according to claim 8, wherein the inverter controller is configured to transmit, in response to an instruction for switching off the photovoltaic string, a switch-off signal generation instruction to the control unit, wherein the control unit controls a switch state of the first controllable switch in the DC/DC boost circuit in response to the switch-off signal generation instruction, to control the first capacitor to generate a switch-off control signal with a first characteristic waveform; and the inverter controller is further configured to transmit, in response to an instruction for switching on the photovoltaic string, a switch-on signal generation instruction to the control unit, wherein the control unit controls, in response to the switch-on signal generation instruction, the second capacitor of the DC/DC boost circuit or the direct current power supply circuit to charge the first capacitor until the voltage of the first capacitor reaches the first voltage threshold, wherein a switch state of the first controllable switch is controlled, to control the first capacitor to generate a switch-on control signal with a second characteristic waveform.

10. The inverter according to claim 8, wherein the inverter comprises a plurality of direct current input ends respectively connected to circuits for modulating a control signal according to claim 2, wherein for each of the circuits for modulating a control signal, the input end of the DC/DC boost circuit is connected to a direct current input end of the inverter corresponding to the circuit for modulating a control signal;

output ends of all the DC/DC boost circuits are connected in parallel and are connected to a direct current input end of the inverter circuit; and all the DC/DC boost circuits share the second controllable switch, or share the fourth controllable switch, the second unidirectional conduction device and the direct current power supply circuit.

11. A system for controlling a photovoltaic string, comprising:

the inverter according to claim 8; and at least one photovoltaic string, wherein each of the at least one photovoltaic string comprises: a plurality of photovoltaic modules connected in series; and a plurality of circuit breakers connected to output ends of the plurality of photovoltaic modules in one to one correspondence, wherein all of the plurality of circuit breakers are connected in series and are connected to a direct current input end of the inverter; and each of the plurality of circuit breakers is configured to analyze a control signal outputted by the inverter to obtain a control instruction, and respond to the control instruction.

12. The system according to claim 11, wherein for analyzing the control signal outputted by the inverter to obtain the control instruction and respond to the control instruction, the circuit breaker is configured to:

determine, when determining that the control signal outputted by the inverter has a first predetermined characteristic waveform, that the control signal is a switch-off control signal, to switch off a photovoltaic module connected to the circuit breaker; and determine, when determining that the control signal outputted by the inverter has a second predetermined characteristic waveform, that the control signal is a switch-on control signal, to switch on the photovoltaic module connected to the circuit breaker.

13. The system according to claim 11, wherein each of the plurality of photovoltaic modules in the photovoltaic string is provided with a component controller, wherein the component controller is configured to determine, when it is determined that the control signal outputted by the inverter has a third predetermined characteristic waveform, that the control signal is a monitoring signal, to upload state data of the photovoltaic module to the inverter.

14. The circuit according to claim 2, further comprising:

a direct current power supply circuit;

a fourth controllable switch; and a second unidirectional conduction device, wherein an output port of the direct current power supply circuit is connected in series with the fourth controllable switch and the second unidirectional conduction device sequentially, and is connected to the input end of the DC/DC boost circuit; and an alternating current end of the direct current power supply circuit is configured to connect with an alternating current power supply;

the second unidirectional conduction device is configured to cause electric energy outputted by the direct current power supply circuit to flow to the input end of the DC/DC boost circuit, and wherein the control unit is further configured to:

control the fourth controllable switch to be switched on when the voltage of the first capacitor is less than or equal to the first voltage threshold, to charge the first capacitor by the direct current power supply circuit; or control the fourth controllable switch to be switched on when the first controllable switch is controlled to be switched off, to charge the first capacitor by the direct current power supply circuit.

15. The circuit according to claim 6, further comprising:

a direct current power supply circuit;

a fourth controllable switch; and a second unidirectional conduction device, wherein an output port of the direct current power supply circuit is connected in series with the fourth controllable switch and the second unidirectional conduction device sequentially, and is connected to the input end of the DC/DC boost circuit; and an alternating current end of the direct current power supply circuit is configured to connect with an alternating current power supply;

the second unidirectional conduction device is configured to cause electric energy outputted by the direct current power supply circuit to flow to the input end of the DC/DC boost circuit, and wherein the control unit is further configured to:

control the fourth controllable switch to be switched on when the voltage of the first capacitor is less than or equal to the first voltage threshold, to charge the first capacitor by the direct current power supply circuit; or control the fourth controllable switch to be switched on when the first controllable switch is controlled to be switched off, to charge the first capacitor by the direct current power supply circuit.

16. The inverter according to claim 8, wherein the inverter comprises a plurality of direct current input ends respectively connected to circuits for modulating a control signal according to claim 3, wherein for each of the circuits for modulating a control signal, the input end of the DC/DC boost circuit is connected to a direct current input end of the inverter corresponding to the circuit for modulating a control signal;

output ends of all the DC/DC boost circuits are connected in parallel and are connected to a direct current input end of the inverter circuit; and all the DC/DC boost circuits share the second controllable switch, or share the fourth controllable switch, the second unidirectional conduction device and the direct current power supply circuit.

17. The inverter according to claim 8, wherein the inverter comprises a plurality of direct current input ends respectively connected to circuits for modulating a control signal according to claim 7, wherein for each of the circuits for modulating a control signal, the input end of the DC/DC boost circuit is connected to a direct current input end of the inverter corresponding to the circuit for modulating a control signal;

output ends of all the DC/DC boost circuits are connected in parallel and are connected to a direct current input end of the inverter circuit; and all the DC/DC boost circuits share the second controllable switch, or share the fourth controllable switch, the second unidirectional conduction device and the direct current power supply circuit.

* * * * *